US011291867B2

(12) United States Patent
Kikkawa et al.

(10) Patent No.: US 11,291,867 B2
(45) Date of Patent: Apr. 5, 2022

(54) INTERDENTAL CLEANING TOOL

(71) Applicant: KOBAYASHI PHARMACEUTICAL CO., LTD., Osaka (JP)

(72) Inventors: Tasuku Kikkawa, Osaka (JP); Narutomo Shiraki, Osaka (JP); Noboru Kusakabe, Osaka (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 185 days.

(21) Appl. No.: 16/309,259

(22) PCT Filed: Sep. 26, 2017

(86) PCT No.: PCT/JP2017/034656
§ 371 (c)(1),
(2) Date: Mar. 7, 2019

(87) PCT Pub. No.: WO2018/062135
PCT Pub. Date: Apr. 5, 2018

(65) Prior Publication Data
US 2019/0192265 A1    Jun. 27, 2019

(30) Foreign Application Priority Data

Sep. 30, 2016 (JP) .............................. JP2016-193179
Sep. 21, 2017 (JP) .............................. JP2017-180847

(51) Int. Cl.
*A61C 15/02* (2006.01)
*A61Q 11/00* (2006.01)
(Continued)

(52) U.S. Cl.
CPC .............. *A61Q 11/00* (2013.01); *A61C 15/02* (2013.01); *C08J 5/043* (2013.01); *C08J 5/10* (2013.01);
(Continued)

(58) Field of Classification Search
CPC ............................ A61C 15/02; A61K 2800/92
See application file for complete search history.

(56) References Cited

U.S. PATENT DOCUMENTS 6,284,831 B1    9/2001  Shimpuku
2015/0114428 A1  4/2015  Kato
(Continued)

FOREIGN PATENT DOCUMENTS

CN    1184130 A    6/1998
JP    S62-243633 A  10/1987
(Continued)

OTHER PUBLICATIONS

International Search Report for International Application No. PCT/JP2017/034656 dated Nov. 28, 2017 (2 Sheets).
(Continued)

*Primary Examiner* — Cris L. Rodriguez
*Assistant Examiner* — Brianne E Kalach
(74) *Attorney, Agent, or Firm* — Kratz, Quintos & Hanson, LLP

(57) ABSTRACT

An interdental cleaning tool (1) that includes a base (10) that has a shaft (20) shaped to be capable of being inserted between teeth, the base (10) being formed from a composite material that contains a synthetic resin, a reinforcement containing glass, and a copolymer having, as structural units, a polyolefin and an anhydride of an unsaturated carboxylic acid.

9 Claims, 18 Drawing Sheets

(51) Int. Cl.
*C08L 23/12* (2006.01)
*C08J 5/10* (2006.01)
*C08J 5/04* (2006.01)
C08L 35/00 (2006.01)
C08K 3/40 (2006.01)
C08K 7/14 (2006.01)
C08K 7/20 (2006.01)
C08K 3/013 (2018.01)

(52) U.S. Cl.
CPC ......... *C08L 23/12* (2013.01); *A46B 2200/108* (2013.01); *C08J 2323/14* (2013.01); *C08J 2423/12* (2013.01); *C08K 3/013* (2018.01); *C08K 3/40* (2013.01); *C08K 7/14* (2013.01); *C08K 7/20* (2013.01); *C08L 35/00* (2013.01)

(56) References Cited

U.S. PATENT DOCUMENTS

2016/0135657 A1* 5/2016 Mao .................. A47L 13/17 433/89
2016/0367345 A1* 12/2016 Wallstrom ............. A46B 9/005
2017/0189148 A1 7/2017 Kato
2017/0319309 A1 11/2017 Gengyo

FOREIGN PATENT DOCUMENTS

| | | |
|---|---|---|
| JP | H02-279748 A | 11/1990 |
| JP | H11-033042 A | 2/1999 |
| JP | H11-181221 A | 7/1999 |
| JP | 2016-087362 A | 5/2016 |
| WO | 2013/176297 A1 | 11/2013 |
| WO | 2016/076241 A1 | 5/2016 |

OTHER PUBLICATIONS

Office Action of corresponding Chinese Patent Application No. 201780057376.8 dated Sep. 29, 2020 (7 sheets, 7 sheets translation, 14 sheets total).

Extended European Search Report for European Patent Application No. 17856085.0 dated Mar. 20, 2020 (7 sheets).

* cited by examiner

FIG. 7

|  | COMPARATIVE EXAMPLE 1 | EXAMPLE 1 |
|---|---|---|
| POLYPROPYLENE (HOMOPOLYMER) | 90 | 89 |
| SCALE-SHAPED GLASS | 10 | 10 |
| POLYPROPYLENE - MALEIC ANHYDRIDE COPOLYMER 1 (ACID VALUE: 12.8) | - | 1 |
| SUM (g) | 100 | 100 |
| ACID VALUE DEGREE WHEN CONTENT (g) OF REINFORCEMENT IS 100 | 0 | 128 |
| STRENGTH IMPROVEMENT DEGREE | - | ++ |
| BOWING IMPROVEMENT DEGREE | - | +++ |

FIG. 8

| | COMPARATIVE EXAMPLE 2 | EXAMPLE 2 | EXAMPLE 3 | EXAMPLE 4 | EXAMPLE 5 |
|---|---|---|---|---|---|
| POLYPROPYLENE (HOMOPOLYMER) | 75 | 74 | 72 | 70 | 68 |
| SCALE-SHAPED GLASS | 25 | 25 | 25 | 25 | 25 |
| POLYPROPYLENE – MALEIC ANHYDRIDE COPOLYMER 1 (ACID VALUE: 12.8) | - | 1 | 3 | 5 | 7 |
| SUM (g) | 100 | 100 | 100 | 100 | 100 |
| ACID VALUE DEGREE WHEN CONTENT (g) OF REINFORCEMENT IS 100 | 0 | 51.2 | 153.6 | 256 | 358.4 |
| STRENGTH IMPROVEMENT DEGREE | - | +++ | +++ | +++ | +++ |
| BOWING IMPROVEMENT DEGREE | - | +++ | +++++ | +++++ | +++++ |

FIG. 9

| | COMPARATIVE EXAMPLE 3 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|---|---|---|---|
| POLYPROPYLENE (HOMOPOLYMER) | 70 | 69 | 67 | 65 | 63 | 68.3 | 67 | 65 | 63 | 67 | 65 | 63 |
| SCALE-SHAPED GLASS | 30 | 30 | 30 | 30 | 30 | 30 | 30 | 30 | 30 | 30 | 30 | 30 |
| POLYPROPYLENE – MALEIC ANHYDRIDE COPOLYMER 1 (ACID VALUE: 12.8) | – | 1 | 3 | 5 | 7 | – | – | – | – | – | – | – |
| POLYPROPYLENE – MALEIC ANHYDRIDE COPOLYMER 2 (ACID VALUE: 26) | – | – | – | – | – | 1.7 | 3 | 5 | 7 | – | – | – |
| POLYPROPYLENE – MALEIC ANHYDRIDE COPOLYMER 3 (ACID VALUE: 52) | – | – | – | – | – | – | – | – | – | 3 | 5 | 7 |
| SUM (g) | 100 | 100 | 100 | 100 | 100 | 100 | 100 | 100 | 100 | 100 | 100 | 100 |
| ACID VALUE DEGREE WHEN CONTENT OF REINFORCEMENT IS 100 | 0 | 42.7 | 128 | 213.3 | 298.7 | 147.3 | 260 | 433.3 | 606.7 | 520 | 866.7 | 1213.3 |
| STRENGTH IMPROVEMENT DEGREE | – | +++ | +++ | +++++ | ++ | +++ | +++ | ++++ | + | ++++ | ++++ | + |
| BOWING IMPROVEMENT DEGREE | – | +++++ | +++++ | +++++ | +++++ | +++ | +++++ | ++++ | + | ++++ | +++++ | ++++ |

FIG. 10

|  | COMPARATIVE EXAMPLE 4 | EXAMPLE 17 |
|---|---|---|
| POLYPROPYLENE (HOMOPOLYMER) | 65 | 64 |
| SCALE-SHAPED GLASS | 35 | 35 |
| POLYPROPYLENE - MALEIC ANHYDRIDE COPOLYMER 1 (ACID VALUE: 12.8) | - | 1 |
| SUM(g) | 100 | 100 |
| ACID VALUE DEGREE WHEN CONTENT (g) OF REINFORCEMENT IS 100 | 0 | 36.6 |
| STRENGTH IMPROVEMENT DEGREE | - | ++ |
| BOWING IMPROVEMENT DEGREE | - | +++ |

FIG. 11

|  | COMPARATIVE EXAMPLE 5 | EXAMPLE 18 |
|---|---|---|
| POLYPROPYLENE (HOMOPOLYMER) | 88.5 | 87.5 |
| GLASS FIBER | 10 | 10 |
| POLYPROPYLENE - MALEIC ANHYDRIDE COPOLYMER 1 (ACID VALUE: 12.8) | – | 1 |
| TITANIUM DIOXIDE | 1.5 | 1.5 |
| SUM(g) | 100 | 100 |
| ACID VALUE DEGREE WHEN CONTENT (g) OF REINFORCEMENT IS 100 | 0 | 128 |
| STRENGTH IMPROVEMENT DEGREE | – | ++ |
| BOWING IMPROVEMENT DEGREE | – | +++ |

FIG. 12

| | COMPARATIVE EXAMPLE 6 | EXAMPLE 19 | EXAMPLE 20 | EXAMPLE 21 |
|---|---|---|---|---|
| POLYPROPYLENE (HOMOPOLYMER) | 73.5 | 72.5 | 70.5 | 66.5 |
| GLASS FIBER | 25 | 25 | 25 | 25 |
| POLYPROPYLENE - MALEIC ANHYDRIDE COPOLYMER 1 (ACID VALUE: 12.8) | - | 1 | 3 | 7 |
| TITANIUM DIOXIDE | 1.5 | 1.5 | 1.5 | 1.5 |
| SUM (g) | 100 | 100 | 100 | 100 |
| ACID VALUE DEGREE WHEN CONTENT (g) OF REINFORCEMENT IS 100 | 0 | 51.2 | 153.6 | 358.4 |
| STRENGTH IMPROVEMENT DEGREE | - | +++ | +++ | +++ |
| BOWING IMPROVEMENT DEGREE | - | +++ | +++++ | +++++ |

FIG. 13

| | COMPARATIVE EXAMPLE 7 | EXAMPLE 22 | EXAMPLE 23 | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 |
|---|---|---|---|---|---|---|---|---|---|---|---|---|
| POLYPROPYLENE (HOMOPOLYMER) | 70 | 69 | 66 | 64 | 63 | 68.3 | 67 | 65 | 63 | 67 | 65 | 63 |
| GLASS FIBER | 30 | 30 | 30 | 30 | 30 | 30 | 30 | 30 | 30 | 30 | 30 | 30 |
| POLYPROPYLENE – MALEIC ANHYDRIDE COPOLYMER 1 (ACID VALUE: 12.8) | - | 1 | 3 | 5 | 7 | - | - | - | - | - | - | - |
| POLYPROPYLENE – MALEIC ANHYDRIDE COPOLYMER 2 (ACID VALUE: 26) | - | - | - | - | - | 1.7 | 3 | 5 | 7 | - | - | - |
| POLYPROPYLENE – MALEIC ANHYDRIDE COPOLYMER 3 (ACID VALUE: 52) | - | - | - | - | - | - | - | - | - | 3 | 5 | 7 |
| SUM (g) | 100 | 100 | 100 | 100 | 100 | 100 | 100 | 100 | 100 | 100 | 100 | 100 |
| ACID VALUE DEGREE WHEN CONTENT OF REINFORCEMENT IS 100 | 0 | 42.7 | 128 | 213.3 | 298.7 | 147.3 | 260 | 433.3 | 606.7 | 520 | 866.7 | 1213.3 |
| STRENGTH IMPROVEMENT DEGREE | - | ++ | +++ | +++++ | ++ | +++ | +++ | ++++ | + | ++++ | +++ | + |
| BOWING IMPROVEMENT DEGREE | - | ++++ | +++++ | +++++ | +++ | +++ | +++++ | +++++ | + | +++++ | +++++ | +++ |

FIG. 14

|  | COMPARATIVE EXAMPLE 8 | EXAMPLE 33 | EXAMPLE 34 |
|---|---|---|---|
| POLYPROPYLENE (HOMOPOLYMER) | 69 | 66 | 64 |
| GLASS FIBER | 30 | 30 | 30 |
| POLYPROPYLENE - MALEIC ANHYDRIDE COPOLYMER 1 (ACID VALUE: 12.8) | - | 3 | 5 |
| ZINC SULFIDE | 1 | 1 | 1 |
| SUM (g) | 100 | 100 | 100 |
| ACID VALUE DEGREE WHEN CONTENT (g) OF REINFORCEMENT IS 100 | 0 | 128 | 213.3 |
| STRENGTH IMPROVEMENT DEGREE | - | +++ | +++ |
| BOWING IMPROVEMENT DEGREE | - | +++++ | +++++ |

FIG. 15

|  | COMPARATIVE EXAMPLE 9 | EXAMPLE 35 |
|---|---|---|
| POLYPROPYLENE (HOMOPOLYMER) | 64 | 61 |
| GLASS FIBER | 35 | 35 |
| POLYPROPYLENE - MALEIC ANHYDRIDE COPOLYMER 1 (ACID VALUE: 12.8) | – | 3 |
| ZINC SULFIDE | 1 | 1 |
| SUM(g) | 100 | 100 |
| ACID VALUE DEGREE WHEN CONTENT (g) OF REINFORCEMENT IS 100 | 0 | 109.7 |
| STRENGTH IMPROVEMENT DEGREE | – | +++ |
| BOWING IMPROVEMENT DEGREE | – | +++++ |

FIG. 16

| | PRODUCTION EXAMPLE 1 | PRODUCTION EXAMPLE 2 | PRODUCTION EXAMPLE 3 | PRODUCTION EXAMPLE 4 |
|---|---|---|---|---|
| POLYPROPYLENE (HOMOPOLYMER) | 71 | 72.5 | – | – |
| POLYETHYLENE | – | – | 64.5 | 66 |
| SCALE-SHAPED GLASS | 25 | 25 | 30 | – |
| GLASS FIBER | – | – | – | 30 |
| POLYPROPYLENE – MALEIC ANHYDRIDE COPOLYMER 1 (ACID VALUE: 12.8) | 2 | 1 | – | – |
| POLYETHYLENE – MALEIC ANHYDRIDE COPOLYMER | – | – | 3 | 3 |
| TITANIUM DIOXIDE | – | – | – | 1 |
| ZINC SULFIDE | 2 | 1.5 | 2.5 | – |
| SUM (g) | 100 | 100 | 100 | 100 |

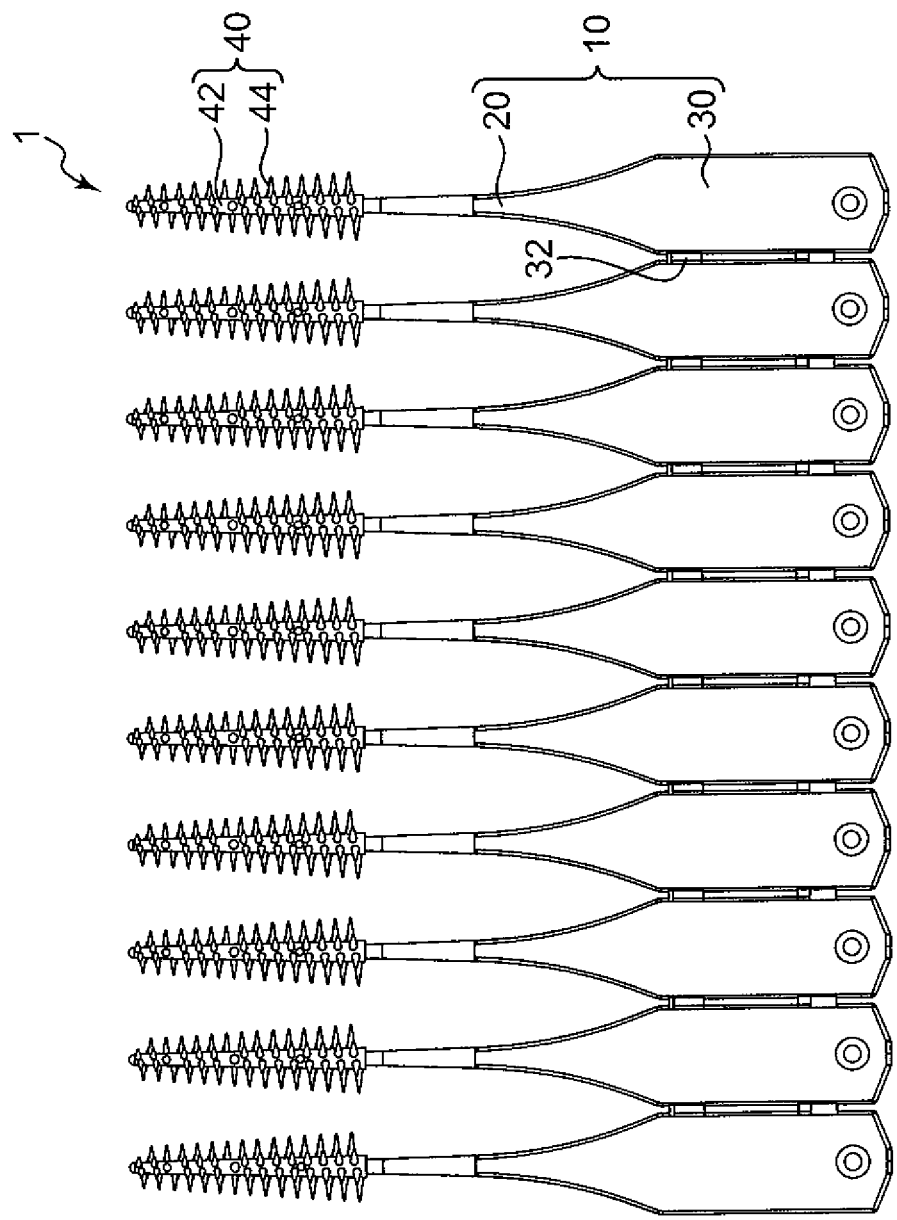

INTERDENTAL CLEANING TOOL

TECHNICAL FIELD

The present invention relates to an interdental cleaning tool.

BACKGROUND ART

Conventionally, an interdental cleaning tool for cleaning between teeth is known. For example, Patent Literature 1 discloses an interdental cleaning tool provided with a base having a shape extending in a specific direction and a cleaner made of an elastomer. The base has a shaft shaped to be capable of being inserted between teeth and a gripper shaped to be capable of being gripped with fingers. The cleaner has a shape that covers a part (a site including a tip end) of an outer circumferential surface of the shaft.

The base is formed from a composite material containing a synthetic resin such as polypropylene and a reinforcement such as glass fiber (material in which the reinforcement is added to the synthetic resin). The reinforcement is added to increase the strength (particularly a buckling load) of the shaft. This reinforcement is oriented so that the longitudinal direction of the reinforcement may coincide with the axial direction of the shaft. Specifically, by filling an inside of a mold, which has a space corresponding to the base, with the composite material along the axial direction of the shaft, the reinforcement is oriented so that the longitudinal direction of the reinforcement may coincide with the axial direction of the shaft. This orientation of the reinforcement contributes to an improvement in the buckling load of the shaft.

In an interdental cleaning tool such as disclosed in Patent Literature 1, the shaft is comparatively easily broken when a bending load is applied to the shaft while the buckling strength of the shaft is effectively enhanced. This will be conspicuous particularly in cleaning an interdental gap between back teeth with the interdental cleaning tool. Specifically, in cleaning the interdental gap between back teeth, the shaft is inserted towards the back tooth side in an oral cavity and, after the tip end of the shaft is brought into contact with the side surface of the back teeth, the shaft is thrust as it is so that the shaft may be inserted into the interdental gap between the back teeth. For this reason, the shaft assumes a curved shape in a state of having been inserted in the interdental gap between the back teeth. Further, in cleaning from that state, the gripper is operated so that the shaft may be curved in various directions with a fulcrum located at a site of the shaft that is positioned between the back teeth. This makes the shaft liable to be broken at the site serving as the fulcrum or in a neighborhood thereof. For this reason, bowing is demanded in the shaft.

CITATION LIST

Patent Literature

Patent Literature 1: International Patent Publication No. 2013/176297

SUMMARY OF INVENTION

An object of the present invention is to provide an interdental cleaning tool capable of suppressing breakage of the shaft.

As a result of eager studies made in order to solve the aforementioned problems, the present inventors have found out that, in a shaft made of a composite material containing a synthetic resin and a reinforcement, the fact that the reinforcement is liberated from the synthetic resin (the reinforcement is hardly bonded to the synthetic resin) causes the shaft to be easily broken when the shaft is curved. Specifically, when a cross-section of the shaft is observed, it is found out that, since the reinforcement is liberated from the synthetic resin, the cross-sectional area of the shaft that contributes to a cross-sectional secondary moment is smaller by that amount of liberation. In other words, almost all of the bending load acting on the shaft is borne only by the part made of the synthetic resin. Accordingly, when the bending load is applied to the shaft, the bending stress generated in the shaft is larger to make the shaft more liable to be broken in the case in which the shaft is made of a composite material containing a reinforcement as compared with the case in which the shaft is made of a synthetic resin alone.

Accordingly, the present inventors have conceived of an idea that, by enhancing the adhesion between the reinforcement and the synthetic resin, a (flexible) shaft that is hardly broken by the bending load can be obtained while effectively enhancing the buckling load.

The present invention has been made based on viewpoints such as described above. Specifically, an interdental cleaning tool according to one aspect of the present invention comprises a base that has a shaft shaped to be capable of being inserted between teeth, wherein the base is formed from a composite material that contains a synthetic resin, a reinforcement containing glass, and a copolymer having, as structural units, a polyolefin and an anhydride of an unsaturated carboxylic acid.

BRIEF DESCRIPTION OF DRAWINGS

FIG. 7 is a table showing the composition and various kinds of evaluations in each of Example 1 and Comparative Example 1.

FIG. 8 is a table showing the composition and various kinds of evaluations in each of Examples 2 to 5 and Comparative Example 2.

FIG. 9 is a table showing the composition and various kinds of evaluations in each of Examples 6 to 16 and Comparative Example 3.

FIG. 10 is a table showing the composition and various kinds of evaluations in each of Example 17 and Comparative Example 4.

FIG. 11 is a table showing the composition and various kinds of evaluations in each of Example 18 and Comparative Example 5.

FIG. 12 is a table showing the composition and various kinds of evaluations in each of Examples 19 to 21 and Comparative Example 6.

FIG. 13 is a table showing the composition and various kinds of evaluations in each of Examples 22 to 32 and Comparative Example 7.

FIG. 14 is a table showing the composition and various kinds of evaluations in each of Examples 33 to 34 and Comparative Example 8.

FIG. 15 is a table showing the composition and various kinds of evaluations in each of Example 35 and Comparative Example 9.

FIG. 16 is a table showing the composition in each of various kinds of production examples.

FIG. 18 is a front view of a modification of the interdental cleaning tool shown in FIG. 1.

DESCRIPTION OF EMBODIMENTS

Figure 1:
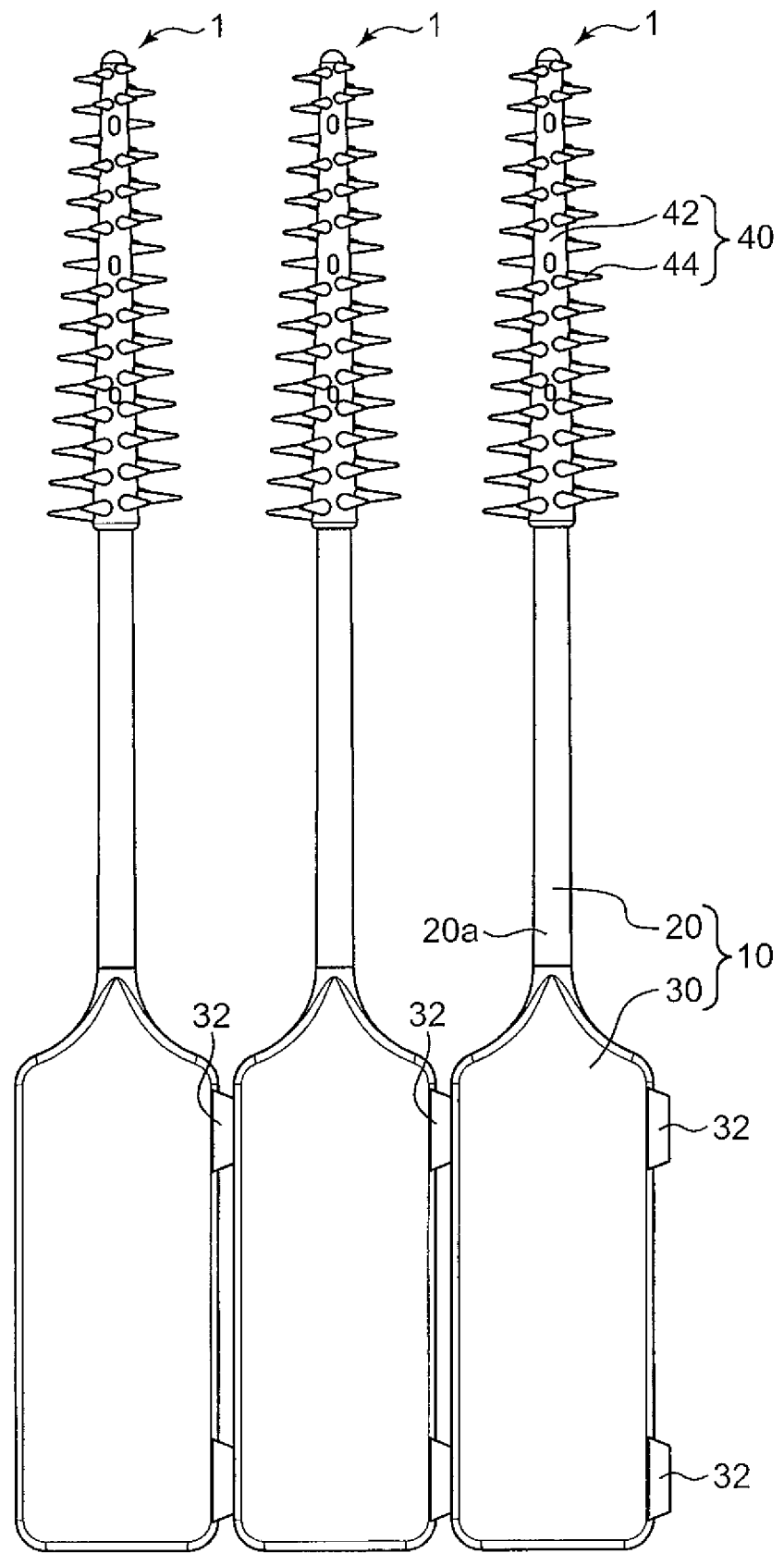
FIG. 1 is a front view of an interdental cleaning tool according to one embodiment of the present invention.

An interdental cleaning tool 1 according to one embodiment of the present invention will be described with reference to FIG. 1. Here, FIG. 1 shows an interdental cleaning tool group having a plurality of (three in FIG. 1) interdental cleaning tools 1. The present interdental cleaning tool 1 is provided with a base 10 and a cleaner 40.

The base 10 has a shaft 20 and a gripper 30.

The shaft 20 extends linearly along a specific direction (up-and-down direction in FIG. 1) and is shaped to be capable of being inserted between teeth. The shaft 20 has a base end 20a that is connected to the gripper 30 and a tip end which is an end on the side that is inserted between the teeth. In the present embodiment, the shaft 20 is formed in a circular cylindrical shape having an outer diameter gradually decreasing as viewed in a direction from the base end 20a towards the tip end.

The gripper 30 extends to be spaced apart from the shaft 20 in an axial direction of the shaft 20 from the base end 20a of the shaft 20 and has a flat shape capable of being gripped with fingers. The grippers 30 that are adjacent to each other are connected by a pair of connectors 32. Each of the connectors 32 is preferably thinner than the grippers 30. Also, each of the connectors 32 preferably has a shape that gradually becomes thinner as viewed in a direction of coming closer to each other. With such a construction, the grippers can be readily separated from each other at the connectors 32, and also separation at the connectors 32 caused by an impact at the time of transportation or the like is suppressed. Further, the boundary between the connector 32 and the gripper 30 located on one side of the connector 32 is preferably thinner than the boundary between the connector 32 and the gripper 30 located on the other side of the connector 32.

Figure 2:
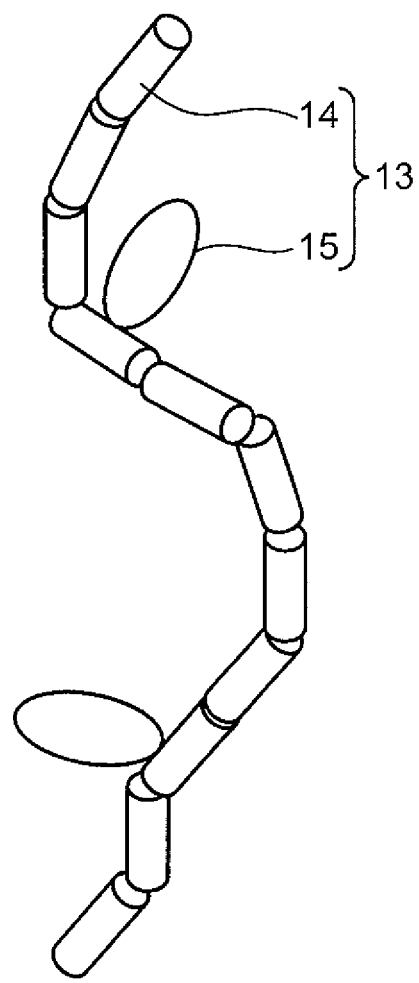
FIG. 2 is a conceptual view of a copolymer having, as structural units, a polyolefin and an anhydride of an unsaturated carboxylic acid.

The base 10 is formed from a composite material that contains a synthetic resin, a reinforcement made of glass, and a copolymer 13 having, as structural units, a polyolefin 14 and an anhydride 15 of an unsaturated carboxylic acid (see FIG. 2).

A thermoplastic resin such as polypropylene, polyethylene, ABS, polybutylene terephthalate, polycarbonate, polyethylene terephthalate, polystyrene, or polyacetal is preferably used as the synthetic resin. From the viewpoint of enhancing the buckling strength of the shaft 20 and ensuring the flexibility, a polyolefin-based resin such as polypropylene or polyethylene is preferably used as the synthetic resin. Among the polyolefin-based resins, polypropylene is preferably used as the synthetic resin. Among the polypropylenes, a homopolymer polypropylene is more preferably used. In the present embodiment, a homopolymer polypropylene is used as the synthetic resin.

At least one kind selected from the group consisting of glass fiber (fibrous reinforcement), scale-shaped glass (plate-shaped reinforcement), and spherical glass (glass beads) is preferably used as the reinforcement.

Referring to FIG. 2, the copolymer 13 has, as structural units, a polyolefin 14 and an anhydride 15 of an unsaturated carboxylic acid. The anhydride 15 of the unsaturated carboxylic acid functions as a polar group, whereas the polyolefin 14 functions as a non-polar group, and the anhydride 15 of the unsaturated carboxylic acid is bonded to the reinforcement made of glass. That is, the copolymer 13 has a function of bonding between the synthetic resin and the reinforcement. In other words, the synthetic resin is firmly bonded to the reinforcement via the copolymer 13. In the present embodiment, polypropylene is used as the polyolefin 14 from the viewpoint of enhancing the bonding force between the synthetic resin and the polyolefin 14. Also, maleic anhydride is used as the anhydride 15 of an unsaturated carboxylic acid. However, the polyolefin 14 and the anhydride 15 of the unsaturated carboxylic acid are not limited to those described above.

In the present embodiment, the content of the copolymer 13 in the composite material is set based on the acid value of the copolymer 13. That is, when the content of the anhydride 15 of the unsaturated carboxylic acid (copolymer 13) is too large relative to the content of the reinforcement in the composite material, the anhydride 15 of the unsaturated carboxylic acid becomes an impurity. Conversely, when the content of the anhydride 15 of the unsaturated carboxylic acid is too small relative to the content of the reinforcement in the composite material, an effective bonding force between the synthetic resin and the reinforcement cannot be obtained. From such a viewpoint, in the present embodiment, the "percentage of the product of the content of the copolymer 13 in the composite material and the acid value of the copolymer 13 relative to the content of the reinforcement in the composite material", that is, the "acid value degree in the case of assuming that the content (g) of the reinforcement in the composite material is 100" is set to be within a suitable range. The acid value degree is represented by the following formula (1).

$$100 \times (\text{content (g) of copolymer 13 in composite material} \times \text{acid value})/\text{content (g) of reinforcement in composite material} \quad (1)$$

This acid value degree is preferably 10 to 7000, more preferably 35 to 1500.

In the present embodiment, the content of the reinforcement in the composite material is set to be 5 weight % or more and 50 weight % or less; the content of the copolymer 13 in the composite material is 0.5 weight % or more and 7 weight % or less; and the acid value of the copolymer 13 is set to be 10 or more and 55 or less. When the content of the reinforcement is set to be 5 weight % or more, it is expected that the strength (buckling load) of the shaft 20 is sufficiently improved. When the content of the reinforcement is set to be 50 weight % or less, a sufficient toughness is ensured in the shaft 20. Here, the molecular weight of the copolymer 13 is typically 1000 to 200000.

The cleaner 40 covers the outer circumferential surface of the shaft 20 and is capable of cleaning between teeth. The cleaner 40 has a cleaner main body 42 covering the outer circumferential surface of the shaft 20 and a plurality of brush bristles 44 each protruding from the outer circumferential surface of the cleaner main body 42. The cleaner 40 is formed from an elastomer. In the present embodiment, a styrene-based elastomer is used as the elastomer. Since the styrene-based elastomer is excellent in compatibility with polypropylene, peeling-off of the cleaner 40 from the shaft 20 is effectively suppressed. Further, firm adhesion between the cleaner 40 and the shaft 20 contributes to suppression of breakage of the shaft 20 by the cleaner 40.

Next, a method of cleaning particularly between back teeth with the interdental cleaning tool 1 will be described.

First, the interdental cleaning tool 1 is inserted towards the back tooth side in an oral cavity with the tip end of the shaft 20 pointed ahead. Further, after the tip ends of the shaft 20 and the cleaner 40 are brought into contact with the side surface of the back teeth, the shaft 20 is thrust as it is so that the shaft 20 and the cleaner 40 may be inserted into the interdental gap between the back teeth. Subsequently, the gripper 30 is operated so that the shaft 20 and the cleaner 40 may reciprocate along the interdental gap. During this, there are cases in which a bending load is applied to the shaft 20; however, since the shaft 20 in the interdental cleaning tool 1 of the present embodiment is flexible, breakage of the shaft 20 is suppressed. Specifically, in the present interdental cleaning tool 1, the polar group of the anhydride 15 of the unsaturated carboxylic acid is bonded to the reinforcement made of glass. In other words, in the present interdental cleaning tool 1, the synthetic resin and the reinforcement are bonded via the copolymer 13. Accordingly, when a bending load is applied to the shaft 20, the area of the shaft 20 that bears the bending load will be larger as compared with the case in which the composite material does not contain the copolymer 13 (case in which the reinforcement is liberated from the synthetic resin), so that the shaft 20 will be flexible, and breakage of the shaft 20 will be suppressed.

Also, in the present interdental cleaning tool 1, the acid value degree is 10 or more and 7000 or less. For this reason, breakage of the shaft 20 is suppressed with more certainty. Specifically, when the acid value degree is 10 or more, the state in which the amount of the anhydride 15 of the unsaturated carboxylic acid is insufficient relative to the amount of the reinforcement is suppressed, so that the adhesion between the synthetic resin and the reinforcement is sufficiently ensured. Further, when the acid value degree is 7000 or less, the state in which the amount of the anhydride 15 of the unsaturated carboxylic acid is too large relative to the amount of the reinforcement, that is, the state in which the anhydride 15 of the unsaturated carboxylic acid acts as an impurity, is suppressed.

Here, it is to be interpreted that the above embodiments disclosed herein are exemplary in all respects and are not limitative. The scope of the present invention is shown not by the description of the aforementioned embodiments but by the scope of the claims, and all changes equivalent in meaning to and within the scope of the claims are included therein.

Figure 17:
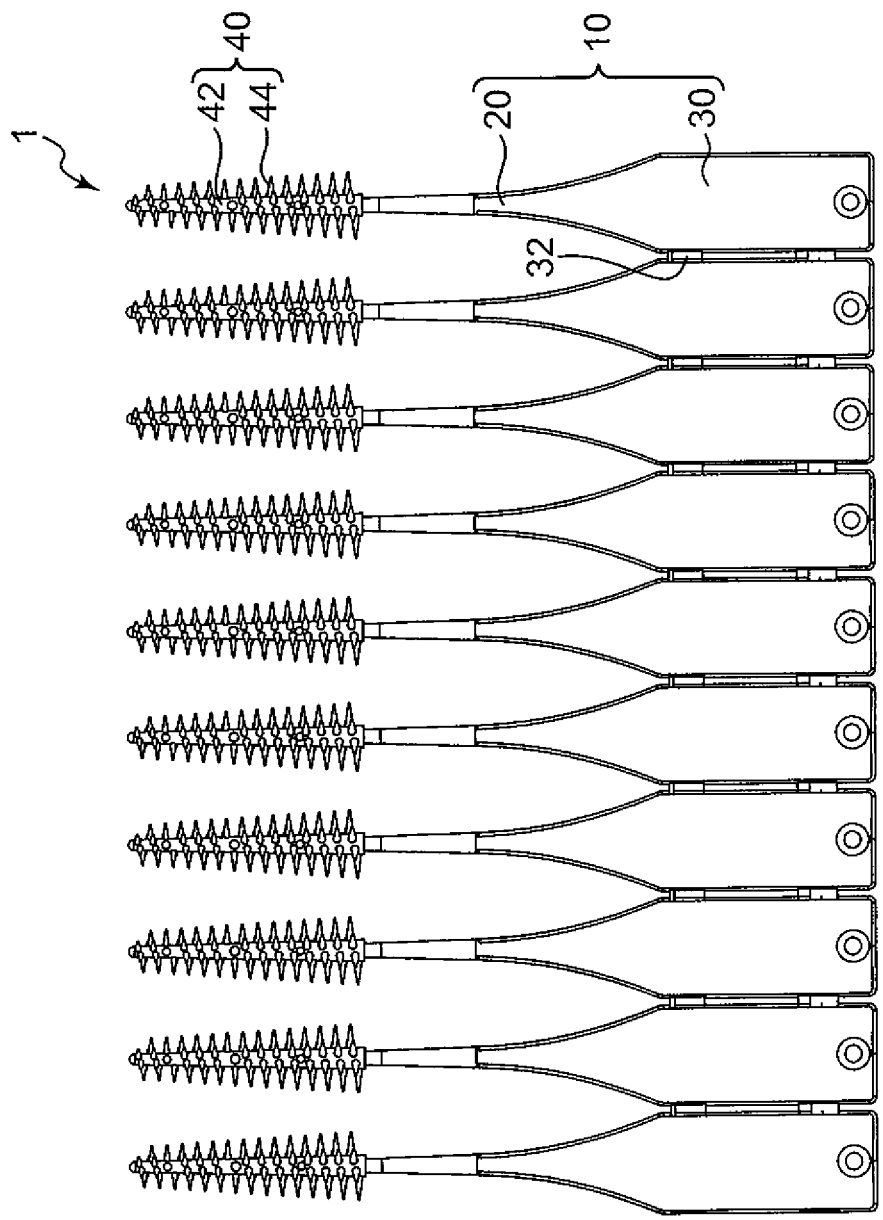
FIG. 17 is a front view of a modification of the interdental cleaning tool shown in FIG. 1.

For example, the gripper 30 in the base 10 or the cleaner 40 may be omitted. Further, the shaft 20 may assume a curved shape in a state in which an external force is not applied to the shaft 20. Also, referring to FIGS. 17 and 18, the shape of the base 10 can be suitably changed.

Also, in order to obtain a white base 10, titanium oxide or zinc sulfide may be blended with the composite material. Here, in the case in which titanium oxide is blended with the composite material, the reinforcement (scale-shaped glass, glass fiber, or the like) contained in the composite material is crushed when the composite material is kneaded and molded, so that a shaft 20 having a high flexibility can be obtained. On the other hand, in the case in which zinc sulfide is blended with the composite material, crushing of the reinforcement (glass fiber, glass flake, or the like) in the process of kneading the composite material is suppressed, so that a shaft 20 having a high rigidity can be obtained. Here, the content of titanium oxide or zinc sulfide in the composite material is preferably set to be about 1.5% or more and 2% or less.

Examples

With respect to the interdental cleaning tool 1 of the aforementioned embodiments, 35 kinds of examples were prepared, and also 9 kinds of comparative examples corresponding to the examples were prepared. The composition of each example and each comparative example is as shown in FIGS. 7 to 15. Here, scale-shaped glass is available from Nippon Sheet Glass Company, Ltd. and others, and glass fiber is available from Asahi Fiber Glass Co., Ltd., Nitto Boseki Co., Ltd., Central Glass Co., Ltd., and others. Further, FIGS. 7 to 15 show three evaluations on these examples and comparative examples, that is, (1) acid value degree, (2) strength improvement degree of the shaft 20, and (3) bowing improvement degree of the shaft 20. Hereafter, the evaluation method in each evaluation and the results thereof will be described.

(1) Acid Value Degree

The acid value degree was calculated based on the above formula (1). Here, since each of the comparative examples does not contain the copolymer 13, zero is given in the section of "acid value degree in the case of assuming that the content (g) of the reinforcement is 100".

Figure 3:
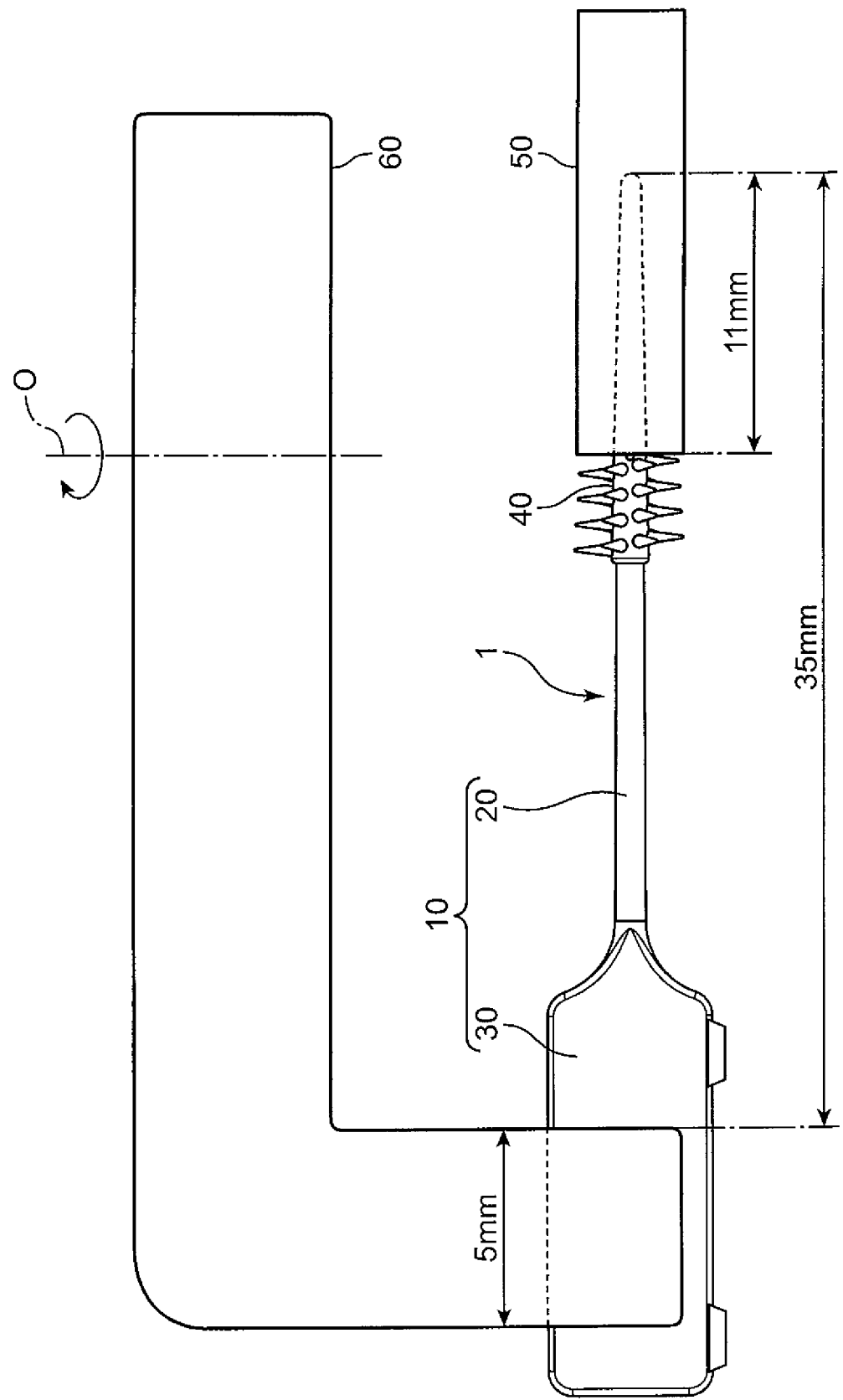
FIG. 3 is a side view schematically illustrating a device for measuring the strength and the bowing degree of a shaft of the interdental cleaning tool shown in FIG. 1.
Figure 4:
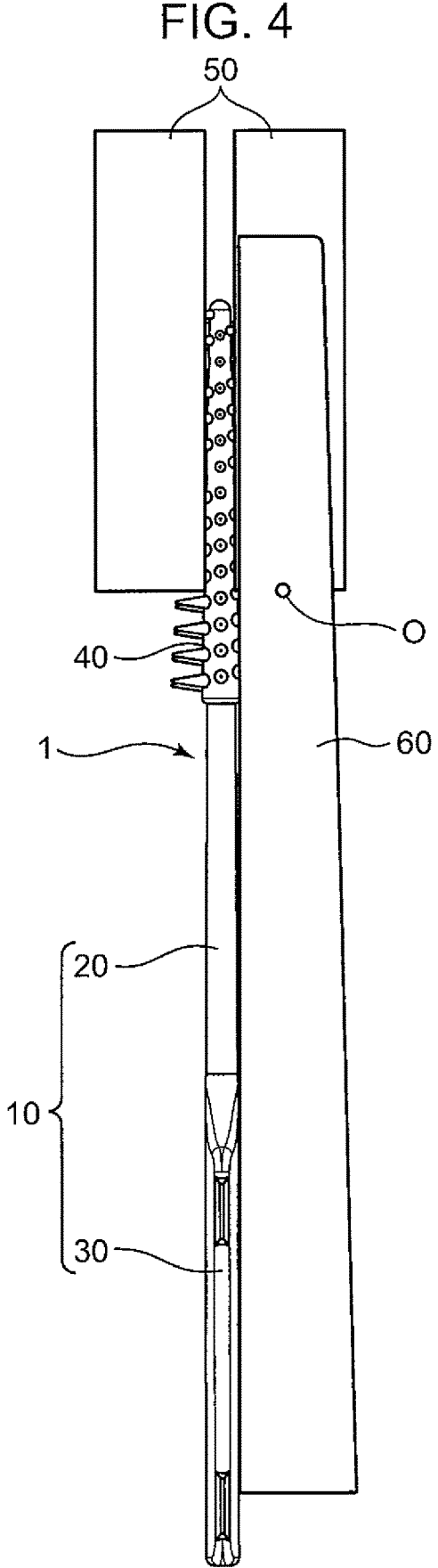
FIG. 4 is a plan view showing a state in which a pressing tool is in contact with the interdental cleaning tool in the device shown in FIG. 3.
Figure 5:
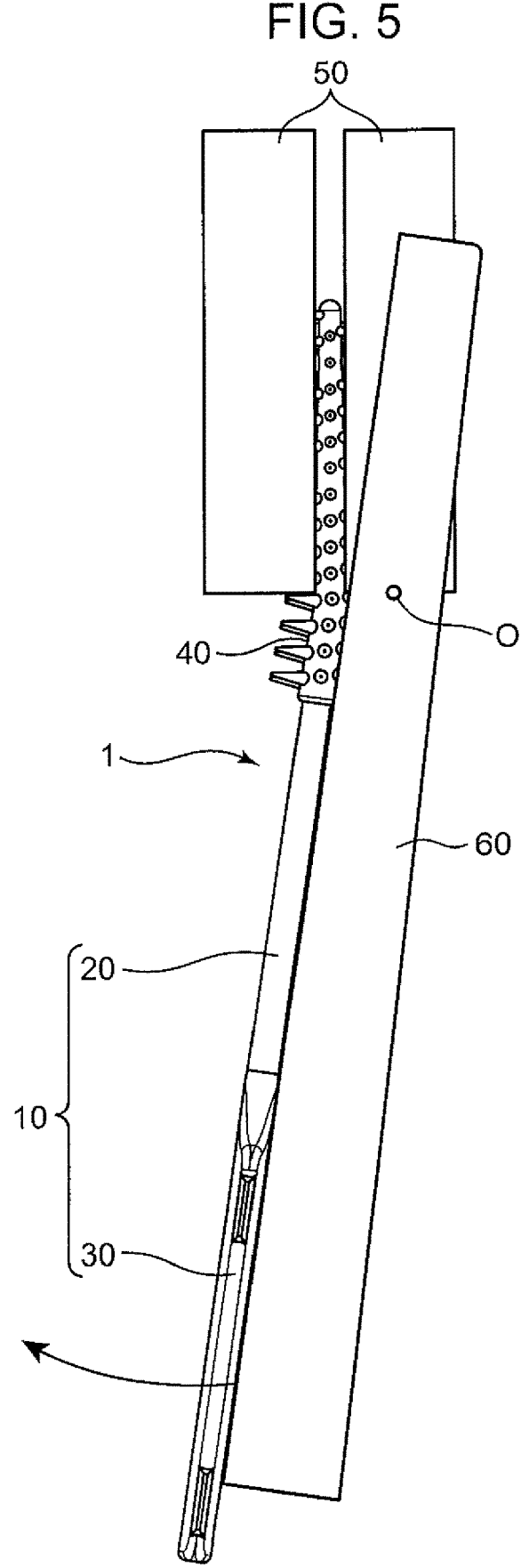
FIG. 5 is a plan view showing a state in which the pressing tool is pressing the interdental cleaning tool in the device shown in FIG. 3.

(2) Strength Improvement Degree of Shaft 20,

Referring to FIGS. 3 to 5, this measurement was carried out by using a sandwiching member 50 capable of sandwiching the shaft 20 and a pressing tool 60 capable of measuring a torque. Specifically, this measurement was carried out by rotating the pressing tool 60 at a rotation speed of 20 rpm with the center located at a rotation axis O in a state in which the site from the tip end of the shaft 20 to the position of 11 mm in the interdental cleaning tool 1 was sandwiched by the sandwiching member 50, and pressing a site (gripper 30) located at 35 mm from the tip end of the shaft 20 (at 24 mm from the rotation axis O) in the interdental cleaning tool 1 while the pressing tool 60 is in rotation. Here, referring to FIG. 3, the width of the site that is located in the pressing tool 60 and presses the interdental cleaning tool 1 is 5 mm.

Figure 6:
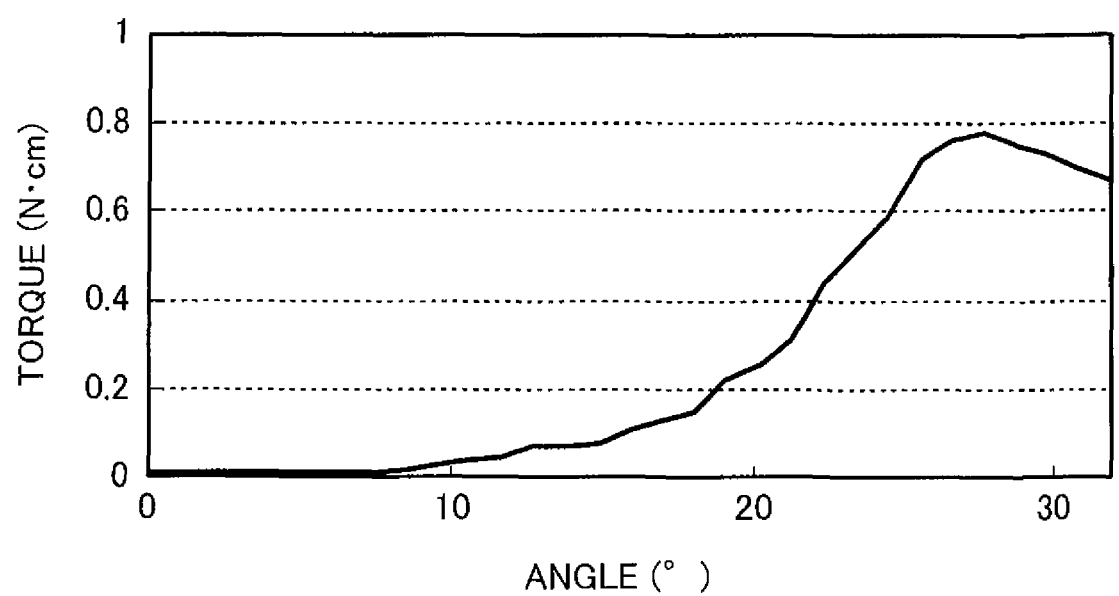
FIG. 6 is a graph showing a relationship between an angle and a torque of the pressing tool in Example 2.

FIG. 6 shows the results of this test. Here, FIG. 6 is a graph showing the test result of Example 2. The peak value of the torque in FIG. 6 was evaluated as the "strength" of the shaft 20. Here, the reason why the torque measured with the pressing tool 60 decreases after reaching the peak value is that the shaft 20 has been broken. Also, a digital torque meter TNX-0.5 (manufactured by Nidec-Shimpo Corporation) was used as the sandwiching member 50 and the pressing tool 60.

The "strength improvement degree" is a strength of the shaft 20 of the example assuming that the strength of the shaft 20 of the comparative example that does not contain the copolymer 13 is 100. In other words, it is evaluated that the larger this value is, the larger the strength of the shaft 20 of the example is as compared with the strength of the shaft 20 of the comparative example serving as an object of comparison. FIGS. 7 to 15 show this strength improvement degree with symbols. The meaning of each symbol is as follows.

- −: less than 103
- +: 103 or more and less than 105
- ++: 105 or more and less than 110
- +++: 110 or more and less than 115
- ++++: 115 or more and less than 120
- +++++: 120 or more (3) Bowing Improvement Degree of Shaft 20

In FIG. 6, the angle at which the torque started to be generated (angle of the pressing tool 60 when the pressing tool 60 was brought into contact with the gripper 30) was assumed to be 0°, and the angle at the peak value of the torque was evaluated as the "bowing degree". The reason why this angle can be evaluated as the bowing degree is as follows. That is, in cleaning the interdental gap between back teeth with the interdental cleaning tool 1, the shaft 20 assumes a curved shape in a state of having been inserted in the interdental gap between the back teeth, and the gripper 30 is operated so that the shaft 20 may be curved in various directions from that state with a fulcrum located at the site of the shaft 20 located between the back teeth. For this reason, the angle at the peak value of the torque measured with the pressing tool 60 in a state in which the shaft 20 was sandwiched by the sandwiching member 50 was evaluated as the bowing degree.

The "bowing improvement degree" is a bowing degree of the shaft 20 of the example assuming that the bowing degree of the shaft 20 of the comparative example that does not contain the copolymer 13 is 100. In other words, it is evaluated that the larger this value is, the larger the bowing degree of the shaft 20 of the example is (the more flexible the shaft 20 of the example is) as compared with the bowing degree of the shaft 20 of the comparative example serving as an object of comparison. FIGS. 7 to 15 show this bowing improvement degree with symbols. The meaning of each symbol is the same as that of the strength improvement degree.

From FIGS. 7 to 15, it has been confirmed that both of the strength and the bowing degree of the shaft 20 have been enhanced by addition of the copolymer 13 in the case in which all of the comparative examples is used as a standard, that is, even when the kind and the content of the reinforcement made of glass in the composite material are different in various ways. In other words, it has been shown that an interdental cleaning tool 1 having a shaft 20 excellent in flexibility can be obtained while ensuring a good buckling strength by forming a base 10 with a composite material further containing a copolymer 13 having, as structural units, a polyolefin 14 and an anhydride 15 of an unsaturated carboxylic acid in addition to a synthetic resin and a reinforcement made of glass.

Also, the aforementioned effects have been confirmed in a similar manner in each of the production examples shown in FIG. 16. That is, in the interdental cleaning tool shown in each production example, an improvement in the strength and the bowing degree of the shaft 20 has been seen when the composite material contains a polyolefin and an anhydride of an unsaturated carboxylic acid.

Here, the above embodiments will be briefly described.

An interdental cleaning tool according to the above embodiment includes a base that has a shaft shaped to be capable of being inserted between teeth, wherein the base is formed from a composite material that contains a synthetic resin, a reinforcement made of glass, and a copolymer having, as structural units, a polyolefin and an anhydride of an unsaturated carboxylic acid.

In the present interdental cleaning tool, the polar group of the anhydride of the unsaturated carboxylic acid is bonded to the reinforcement made of glass, so that the synthetic resin and the reinforcement are bonded via the copolymer. Accordingly, when a bending load is applied to the shaft, the area of the shaft that bears the bending load will be larger (liberation of the reinforcement from the synthetic resin is reduced) as compared with the case in which the composite material does not contain the copolymer, so that the shaft will be flexible, and breakage of the shaft will be suppressed.

Further, in the interdental cleaning tool, the synthetic resin is preferably a polyolefin.

With such a construction, the bonding between the synthetic resin and the copolymer will be firmer, so that the shaft will be more flexible.

In this case, the synthetic resin is preferably polypropylene.

Further, in addition to polypropylene, polyethylene and the like can be mentioned as examples of the polyolefin of the copolymer.

Also, in the interdental cleaning tool, the anhydride of an unsaturated carboxylic acid is preferably an anhydride of an unsaturated dicarboxylic acid. Among the unsaturated dicarboxylic acids, the anhydride of an unsaturated carboxylic acid is preferably itaconic anhydride, maleic anhydride, fumaric anhydride, citraconic anhydride, or mesaconic anhydride, and more preferably is maleic anhydride.

In this mode, the bonding between the reinforcement and the synthetic resin will be firmer, so that the shaft will be further more flexible.

Also, in the interdental cleaning tool, the percentage of the product of the content of the copolymer in the composite material and the acid value of the copolymer relative to the content of the reinforcement in the composite material is preferably 10 or more and 7000 or less.

With such a construction, breakage of the shaft is suppressed with more certainty. Specifically, when the percentage is 10 or more, the state in which the amount of the anhydride of the unsaturated carboxylic acid is insufficient relative to the amount of the reinforcement is suppressed, so that the adhesion between the synthetic resin and the reinforcement is sufficiently ensured. Further, when the percentage is 7000 or less, the state in which the amount of the anhydride of the unsaturated carboxylic acid is too large relative to the amount of the reinforcement, that is, the state in which the anhydride of the unsaturated carboxylic acid acts as an impurity, is suppressed.

Specifically, the content of the reinforcement in the composite material is preferably 5 weight % or more and 50 weight % or less.

With such a construction, the rigidity of the shaft is effectively enhanced, and the flexibility of the shaft is ensured.

In this case, the content of the copolymer in the composite material is preferably 0.5 weight % or more and 7 weight % or less, and the acid value of the copolymer is preferably 10 or more and 55 or less.

With such a construction, compatibility between improving the rigidity of the shaft and ensuring the flexibility of the shaft is made more certain.

Also, in the interdental cleaning tool, the reinforcement is preferably at least one kind selected from the group consisting of glass fiber, spherical glass, and scale-shaped glass.

Further, it is preferable that the interdental cleaning tool is further provided with a cleaner that is made of an elastomer, covers an outer circumferential surface of the shaft, and is capable of cleaning between the teeth.

The invention claimed is:

1. An interdental cleaning tool comprising:
    a base that has a shaft shaped to be capable of being inserted between teeth, wherein
    the base is formed from a composite material that contains a synthetic resin, a reinforcement containing glass, and a copolymer having, as structural units, a polyolefin and an anhydride of an unsaturated carboxylic acid.
2. The interdental cleaning tool according to claim 1, wherein the synthetic resin is a polyolefin.
3. The interdental cleaning tool according to claim 2, wherein the synthetic resin is polypropylene.
4. The interdental cleaning tool according to claim 2, wherein, in the base, the anhydride of the unsaturated carboxylic acid is maleic anhydride.
5. The interdental cleaning tool according to claim 1, wherein a percentage of the product of a content of the copolymer in the composite material and an acid value of the copolymer relative to a content of the reinforcement in the composite material is 10 or more and 7000 or less.
6. The interdental cleaning tool according to claim 5, wherein the content of the reinforcement in the composite material is 5 weight % or more and 50 weight % or less.
7. The interdental cleaning tool according to claim 5, wherein the content of the copolymer in the composite material is 0.5 weight % or more and 7 weight % or less, and the acid value of the copolymer is 10 or more and 55 or less.
8. The interdental cleaning tool according to claim 1, wherein the reinforcement is at least one kind selected from the group consisting of glass fiber, spherical glass, and scale-shaped glass.
9. The interdental cleaning tool according to claim 1, further comprising a cleaner that contains an elastomer, covers an outer circumferential surface of the shaft, and is capable of cleaning between the teeth.

* * * * *